United States Patent [19]
Fujimoto

[11] 3,991,369
[45] Nov. 9, 1976

[54] CARTRIDGE-TYPE RADIO-COMMUNICATION DEVICE

[76] Inventor: Kinya Fujimoto, 1, Nakanomachi, Hachioji, Tokyo, Japan

[22] Filed: June 26, 1975

[21] Appl. No.: 590,486

[30] Foreign Application Priority Data
July 1, 1974  Japan.............................. 49-74281

[52] U.S. Cl................................ 325/102; 325/311; 360/93; 179/100.11
[51] Int. Cl.² .......................................... H04B 1/04
[58] Field of Search .............. 325/15, 16, 21, 102, 325/111, 119, 311; 179/100.11; 360/93

[56] References Cited
UNITED STATES PATENTS

| | | |
|---|---|---|
| 3,582,965 | 6/1971 | DeMetrick .................... 179/100.11 |
| 3,619,515 | 11/1971 | Lace ............................ 179/100.11 |
| 3,632,901 | 1/1972 | Wally .......................... 179/100.11 |
| 3,751,601 | 8/1973 | Wally .......................... 179/100.11 |

FOREIGN PATENTS OR APPLICATIONS 1,226,713  3/1971  United Kingdom................ 325/311

*Primary Examiner*—Robert L. Griffin
*Assistant Examiner*—Aristotelis M. Psitos
*Attorney, Agent, or Firm*—Otto John Munz

[57] ABSTRACT

A cartridge system for use with a conventional cartridge-type tape reproducer. The cartridge system provides radio transmitting and receiving circuits, connections to a microphone and an antenna, and power connections to convert the tape reproducer into the audio output section of a two-way radio. The tape reproducer can also supply power to the radio system.

6 Claims, 4 Drawing Figures

CARTRIDGE-TYPE RADIO-COMMUNICATION DEVICE

BACKGROUND OF THE INVENTION

1. Field of the Invention

The present invention relates to a new simple cartridge-type radio-communication device utilizing a tape reproducer usually installed in automobiles etc.

2. Description of the Prior Art

In recent years, automobiles have had a transducer or sending and receiving device installed for radio communication for enjoyment or business. Such equipment has the disadvantage of reducing the inside space of an automobile. This installation in combination with a cartridge-type reproducer causes not only more reduction of the inside space but also useless duplication of parts such as the low-frequency amplifier, the speaker and other parts.

SUMMARY OF THE INVENTION

The present invention provides a simplified cartridge-type radio-communication device utilizing a cartridge-type tape reproducer and accordingly also functioning to reproduce sound recorded on tape. This function is accomplished according to the present invention by using one cartridge exclusively for radio communication where otherwise a conventional tape cartridge would be used.

BRIEF DESCRIPTION OF THE DRAWINGS

The above and other objects and features of the present invention will become apparent from the following description of embodiments with reference to the accompanying drawings.

DESCRIPTION OF THE PREFERRED EMBODIMENT

Figure 1:
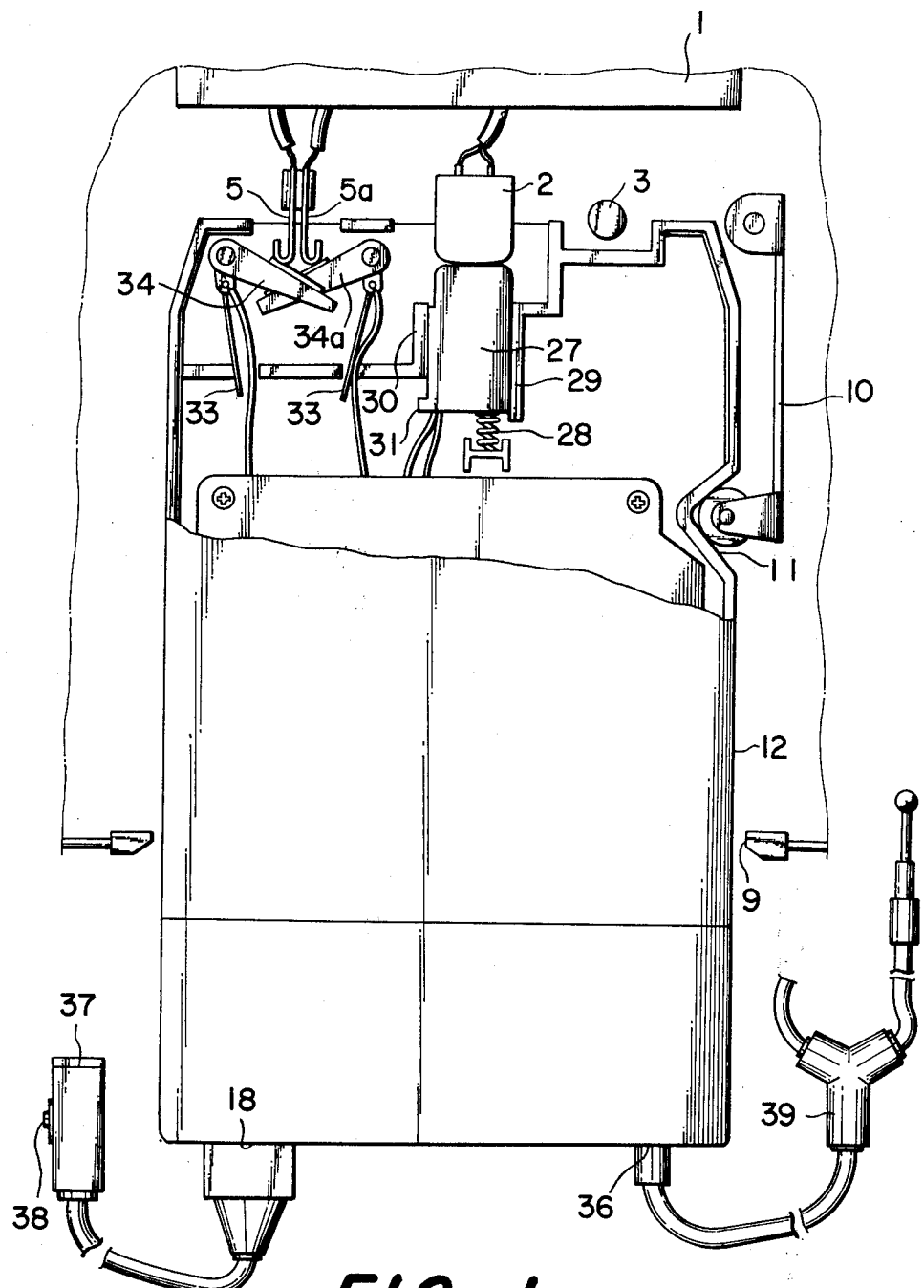
FIG. 1 is a plan, partially cutaway view of a radio communication device according to the present invention.
Figure 2:
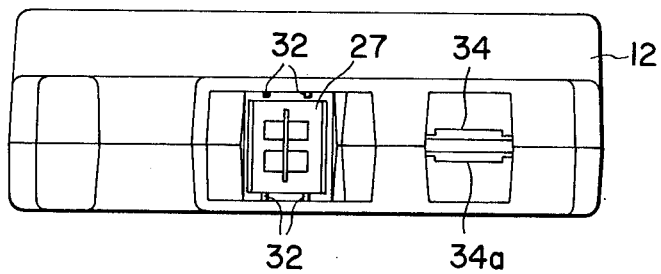
FIGS. 2 and 3 are front and rear views of the cartridge which is for radio communication.
Figure 3:
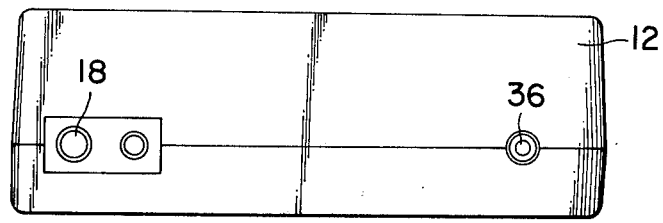

A known tape reproducer, whose body is designated by reference numeral 1, includes a magnetic tape head 2 for sound reproduction, a capstan 3 for controlling the motion of magnetic tape, a motor 4, detection terminals 5 and 5a for detecting the fixed positions such as the sound-record end of a tape, on the basis of which adjustment of the head position and shift of the track are carried out, a low frequency amplifier 6, a speaker 7 and a power source 8, etc. If a tape cartridge (not illustrated) is inserted into a cartridge receiving part 9 in the body 1, a locking lever 10 is engaged with a recess 11 in the side of the cartridge and simultaneously the cartridge actuates a suitable means such as switch to close the power source circuit. Then the tape is held closely between the capstan and a pinch roller (not illustrated) and is allowed to pass in front of the magnetic head to produce sound recorded on the tape.

Figure 4:
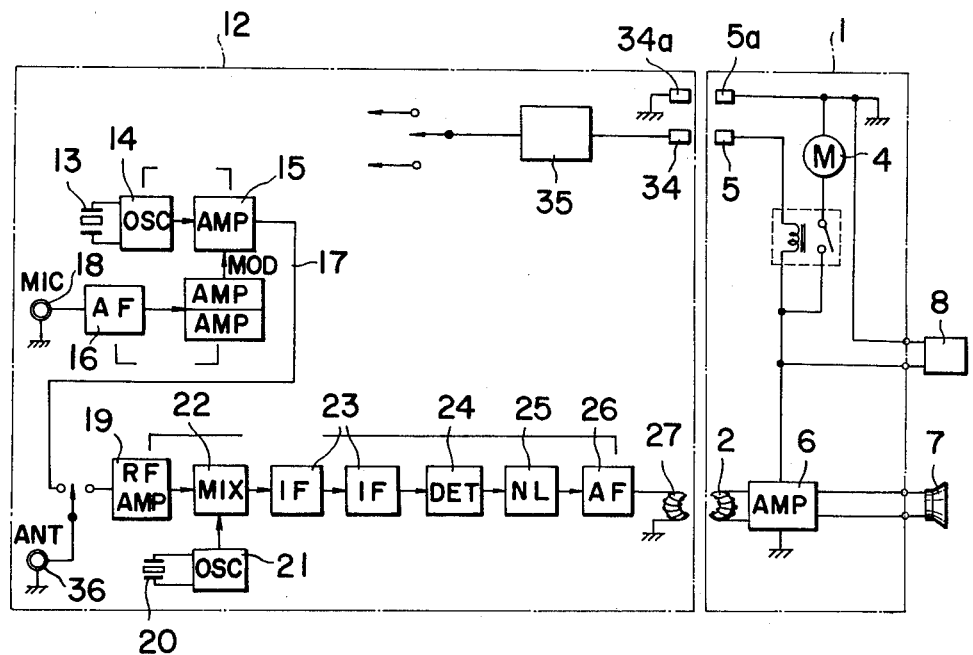
FIG. 4 is a block circuit diagram showing the construction of the device.

The cartridge for radio communication 12 is formed with the same dimensions as those of the conventional tape cartridge and accordingly is adapted to be insertible into the cartridge-receiving part 9 in the body and includes sending and receiving circuits. A preferred sending circuit shown in FIG. 4 includes a resonant crystal 13, an oscillator 14, a power amplifier 15, an audio-frequency amplifier 16, to which the microphone terminal 18 is connected, and a modulator 17. A preferred receiving circuit shown in FIG. 4 includes a high-frequency amplifier 19, a resonant crystal 20, a local oscillator 21, a mixer 22, an intermediate-frequency amplifier 23, a detector 24, a noiseless filter 25 and an audio-frequency amplifier 26. The illustrated output terminal 27 of the receiving circuit, consisting of a magnetic transducer, is mounted movably on walls 29 and 30 and pushed outward under the elastic force of a spring 28 so as to magnetically couple with the magnetic head 2 in the body 1. Numerals 31 and 32 indicate a stopper and a ridge respectively. The magnetic transducer has a slightly wider head to allow magnetic coupling independently of the position of the magnetic head in the body.

The sending and receiving circuits can be connected to an external power source or to a built-in power source in the cartridge. In the illustrated embodiment, electric power is fed alternately to the sending or receiving circuit through a constant-voltage circuit 35 by causing contact terminals 34 and 34a to contact with detection terminals 5 and 5a in the body 1 under elastic force of a spring 33. The power source terminal and an antenna terminal 36 are changed over by a switch 38 provided in the microphone 37. Also, if desired, electric power can be supplied from a power source terminal in a car lighter or the like.

In the illustrated embodiment, the wiring to the antenna terminal 36 is shunted from the car antenna wiring to the car radio suitably through a Y-shape connector 39. Also the terminal can be connected to an antenna for its exclusive use.

For radio communication by the device according to the present invention, first the cartridge for radio communication is inserted into the cartridge-receiving part. Subsequently, if the sending circuit is closed by actuating the switch 38, speech into the microphone 18 can be transmitted. If the receiving circuit is activated by changing over the switch 38, received electric waves can be heard as sound from the speaker 7 in the body of the tape reproducer.

As shown in the example, a magnetic transducer is used as the electrical connection terminal of the cartridge for radio communication and the magnetic tape head is used as that of the body in the tape reproducer so that both terminals are magnetically coupled with each other. Instead of this, mechanical coupling by means of plug and socket or capacitance coupling could be used.

What is claimed is:

1. A cartridge-type radio-communication device utilizing a tape reproducer comprising in combination with the tape reproducer a cartridge exclusively for radio communication adapted to be inserted into a cartridge receiving part in the body of the tape reproducer and including sending and receiving circuits, a microphone attached to the sending circuit and an antenna, wherein the output terminal of the receiving circuit is electrically connected by magnetic coupling to the coupling terminal of said tape reproducer.

2. A radio cartridge system for use with a conventional cartridge-type tape reproducer, the reproducer being designed for use in a conventional type reproducing mode by having a conventional tape cartridge inserted into a cartridge receiving portion of the reproducer for play through a magnetic reproducing head connected to an audio amplifier, the radio cartridge system adapting the tape reproducer for use in a radio communication mode and comprising:
  A. a cartridge body formed with substantially the same dimensions as the conventional tape cartridge and adapted to be placed in the cartridge receiving portion during use of the radio communication mode,
  B. a radio sending circuit and a radio receiving circuit incorporated into the cartridge body,
  C. means for attaching a microphone to the sending circuit for providing a locally originated audio signal to the sending circuit,
  D. connecting means for connecting an antenna to the sending circuit for transmitting an output radio signal corresponding to the locally originated audio signal and for connecting an antenna to the receiving circuit for providing a received radio signal to the radio receiving circuit, and
  E. coupling means for coupling a received audio signal corresponding to the received radio signal from the radio receiving circuit to the audio amplifier in the tape reproducer.

3. A radio cartridge system according to claim 2 wherein the coupling means comprises a magnetic transducer driven by the audio signal and magnetically coupled to the magnetic reproducing head of the tape reproducer.

4. A radio cartridge system according to claim 2 further comprising means for coupling operating power from the tape reproducer to the radio sending and receiving circuit.

5. A radio cartridge system according to claim 2 wherein the connecting means comprises means for alternately connecting a single antenna to the sending circuit and to the receiving circuit.

6. A device for converting a cartridge-type tape reproducer into a radio communication system comprising:
  A. a cartridge exclusively for radio communication adapted to be inserted into a cartridge receiving portion of the tape reproducer,
  B. radio sending and receiving circuits in the cartridge,
  C. a microphone attached to the sending circuit,
  D. an antenna for connection to the sending and receiving circuits, and
  E. magnetic coupling means for electrically connecting the output of the receiving circuit to a magnetic head of the tape reproducer.

* * * * *

UNITED STATES PATENT OFFICE
CERTIFICATE OF CORRECTION

Patent No. 3,991,369     Dated November 9, 1976

Inventor(s) Kinya Fujimoto

It is certified that error appears in the above-identified patent and that said Letters Patent are hereby corrected as shown below:

On the cover sheet item 76 should read:

[76] Inventor: Kinya Fujimoto, 2739-22, Negoya, Tsukui-cho,

Tsukui-gun, Kanagawa Prefecture,

Japan

Signed and Sealed this

Twenty-eighth Day of December 1976

[SEAL]

Attest:

RUTH C. MASON
*Attesting Officer*

C. MARSHALL DANN
*Commissioner of Patents and Trademarks*